United States Patent [19]

Greenwald

[11] Patent Number: 4,597,884
[45] Date of Patent: Jul. 1, 1986

[54] ICE AND SNOW MELT

[76] Inventor: Steve Greenwald, 18 Ann Cir., Richboro, Pa. 18954

[21] Appl. No.: 657,357

[22] Filed: Oct. 2, 1984

[51] Int. Cl.⁴ ............................................. C09K 3/18
[52] U.S. Cl. ........................................ 252/70; 106/13
[58] Field of Search ........................... 252/70; 106/13

[56] References Cited

U.S. PATENT DOCUMENTS

| 3,310,494 | 3/1967 | Sproule et al. | 106/13 |
| 3,537,900 | 11/1970 | Halbert | 106/13 |
| 3,928,654 | 12/1975 | Bonnanzio | 252/70 |
| 4,108,669 | 8/1978 | Otrhalek et al. | 106/13 |
| 4,283,297 | 8/1981 | Peters et al. | 106/13 |

FOREIGN PATENT DOCUMENTS 2124091 11/1972 Fed. Rep. of Germany ........ 106/13

Primary Examiner—Paul Lieberman
Assistant Examiner—Robert A. Wax
Attorney, Agent, or Firm—Steele, Gould & Fried

[57] ABSTRACT

An ice and snow melt material is provided which is a substrate of solid ice and snow melt material coated with a liquid ice and snow melt material. Urea is the preferred substrate and ethylene glycol is the preferred liquid coating.

4 Claims, 1 Drawing Figure

ICE AND SNOW MELT

This invention relates to an ice and snow melting product and in particular relates to a melt product which is a substrate of solid melting material coated with a liquid phase melting compound.

BACKGROUND OF THE INVENTION

There are numerous products available for melting ice and snow. Among the more familiar solid products are rock salt, calcium chloride, urea, and ordinary sand or cinders. All of these materials, while being to some degree effective, have inherent drawbacks.

A major consideration in selecting a melting material is the corrosive effect the melting material will have on the surrounding environment. The corrosive effect should be minimal and, preferably, eliminated. Other considerations include the operating temperature at which the melting process will begin; the temperature at which refreezing may occur after the ice and snow have been melted due to dilution of the melting material; completion of the heat of solution given up during the change from solid to liquid; and the impact on the environment, i.e., the effect of the melting material on soil, water, animals and the environment in general. The activation time for melting to begin is a very important consideration, as is the ability of the melting product to remain where placed. This later consideration is important from the standpoint of the material blowing away and from the standpoint of the material being tracked onto other surfaces. An additional consideration is the effect the melting material will have on electrical conductivity, since the combination of some melting material and water can cause short circuiting in electrical equipment and electrical boxes.

As previously noted, one of the more familiar ice and snow melting materials is urea, and urea's popularity has been enhanced particularly because of its non-corrosive characteristics. Urea is available in several forms and different grades, including prilled and granular forms and agricultural or fertilizer grade and a technical grade. For all its usefulness as a melting agent, however, there are several very real drawbacks to using urea as an ice and snow melt. First of all, urea is very slow acting; accordingly, it is prone to blowing away before ice melting begins. Urea, particularly the prilled form, skids or rolls on the ice, and urea is very susceptible to refreezing. In addition, urea in the spherical, prilled form allows only limited surface contact, and surface contact greatly affects the ability of the urea to act as a freezing suppressant. The more surface contact, the more effective the melting capability. Aside from these drawbacks, urea still fulfills some very important requirements. Urea is relatively inexpensive; is very safe; is non-corrosive; is not detrimental to other structures which it comes into contact with; is essentially environmentally safe; is non-conductive; and is readily available.

In addition to the solid ice melting materials, ice melting can be performed by various ice melting liquids or solutions. Liquids have the advantages of offering quick coverage with maximum surface contact, two desirable characteristics in considering how quickly the melting will begin. There are, however, considerations to be resolved when using liquids that are similar to those considerations given to selecting solid melt materials, and in addition there is the consideration as to what type of equipment will be necessary in order to apply the ice melting liquids.

Liquids which are mostly widely used and most popular include members of the glycol family, especially ethylene glycol and propylene glycol, and various aircraft deicing compositions.

SUMMARY OF THE INVENTION

It is an object of this invention to provide a solid ice and snow melt composition which overcomes many of the disadvantages considered above.

It is an object of this invention to provide an ice and snow melt which has the advantages of both solid and liquid ice melt materials, including the quick initial melting ability of a liquid and the convenience and the time release melting characteristics of a solid.

These objectives are fulfilled in the present invention by providing a substrate of solid ice and snow melt material which is coated with a liquid ice and snow melt material. A preferable combination is a substrate of urea with a coating of ethylene glycol.

BRIEF DESCRIPTION OF THE DRAWING

Further objects and a better understanding of the invention will become apparent from the following description of the invention taken in consideration with the drawing, wherein.

DETAILED DESCRIPTION OF THE INVENTION

Figure 1:
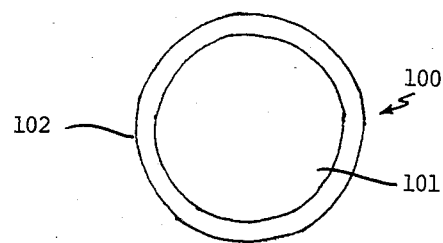
FIG. 1 is a cross section of the ice and snow melt of the present invention.

FIG. 1 shows a cross-sectional view of the ice and snow melt product 100 of the present invention. The product comprises a substrate or core 101 of solid ice and snow melting material surrounded by a coating 102 of liquid phase ice and snow melting material.

The preferred material for use as the substrate 101 is urea (carbonyl amide), however, other ice melting materials such as calcium chloride, sodium chloride (rock salt), and CMA (calcium - magnesium - acetate) can be used. The recognized advantages of urea initially prompted its selection as the primary melt material. Thereafter a search was made to find some additional material or materials that could be combined with the urea to provide a material that overcomes the inherent deficiencies of urea. Principally, the combination would have to decrease surface tension of the ice (i.e. act as a wetting agent) to break the crystal bonds in the ice and have improved refreezing characteristics. Ultimately, it was discovered that coating the solid substrate with a liquid ice melt material enhanced the melt qualities of the urea by providing a material with both the initial quick melting characteristics of a liquid and the benefits of urea. Liquids of the glycol family were found to be very effective when coated onto the solid urea substrate.

The preferred urea substrate is of the agricultural or fertilizer grade of urea and has the following characteristics:

| | |
| --- | --- |
| pH (11% solution) | 8.0–9.5 |
| Ash content | 10.0 ppm |
| free ammonia | 100 ppm |
| odor | none |

| | |
|---|---|
| formula | $$H_2N-\overset{\overset{O}{\|}}{C}-NH_2$$ |
| melting point | 132.7° C. |
| appearance | white, prilled solid |

Sodium chloride (such as PELLADON by Dow Chemical) may also be used as the substrate and may also be coated with the same liquids as the urea.

The liquid phase coating 102 on the substrate 101 is preferably selected from such materials as glycol, especially ethylene glycol and propylene glycol, and aircraft deicing fluids, such as UCAR produced by Union Carbide. It is preferred that the glycol contain corrosion inhibitors and wetting agents in order to enhance the melting and non-corrosive characteristics of the product. This type of glycol preparation is known as an inhibited glycol, and the commercially available UCAR has these various inhibitors and wetting agents as part of its composition.

The liquid phase coating 102 is applied to the substrate 101 by any conventional method, such as mechanically mixing together the substrate and the liquid in a vessal, spraying the liquid onto the substrate, by coating the substrate in a fluidized bed or by vapor deposition.

In providing a glycol coating onto the substrate some consideration must be given to the concentration of the coating liquid. For example, inhibited ethylene glycol in the concentrated form is considered to be too viscous to coat the urea substrate easily and the coating obtained is thicker than desired. To overcome this viscosity problem, the inhibited ethylene glycol is diluted with a solvent. In this instance water was selected as the solvent and the ethylene glycol was diluted by 50%. Other solvents might include acetone, benzene, methanol and phenol. The viscosity thus having been reduced, the desired mixing and coating of the substrate is much more easily obtained. While the preferred viscosity of the inhibited ethylene glycol is that of an approximately 50% diluted solution, it is understood that if a thicker (or thinner) coating on the substrate is desired or necessary, by controlling the concentration of the coating material, the coating thickness can be regulated.

One embodiment of the snow and ice melt product of the invention was prepared by combining a prilled urea substrate and dilute ethylene glycol containing inhibitors. The urea and just enough glycol to coat the urea and still have the urea feel dry were combined in a vessel and stirred by hand. The objective was to obtain the glycol coated urea which still felt dry and had the fluid characteristics of dry urea. It is preferred that the coated urea be stored in a moisture-proof bag or container.

This invention may be embodied in other specific forms without departing from the spirit or essential attributes thereof, and accordingly, reference should be made to the appended claims, rather than to the foregoing specification, as indicating the scope of the invention.

It is to be understood that the foregoing embodiments are given for the purpose of illustration and that other suitable solid and liquid ice melt combinations can be used provided the teachings of this disclosure are followed.

What is claimed is:

1. A non-corrosive solid ice melting composition consisting of prill urea particles and a liquid antifreeze composition, said antifreeze composition coating said urea particles.

2. An ice and snow melt as claimed in claim 1, wherein said coating is selected from ethylene glycol and propylene glycol.

3. An ice and snow melt as claimed in claim 2, wherein said coating further comprises corrosion inhibitors and wetting agents.

4. An ice and snow melt as claimed in claim 1, wherein said coating is aircraft deicing fluid.

* * * * *